May 1, 1945.　　　A. RUSSELL ET AL　　　2,374,838
MECHANISM FOR FEEDING WRAPPERS FROM A STACK
Filed Nov. 25, 1943　　　6 Sheets-Sheet 1

May 1, 1945.  A. RUSSELL ET AL  2,374,838
MECHANISM FOR FEEDING WRAPPERS FROM A STACK
Filed Nov. 25, 1943  6 Sheets-Sheet 5
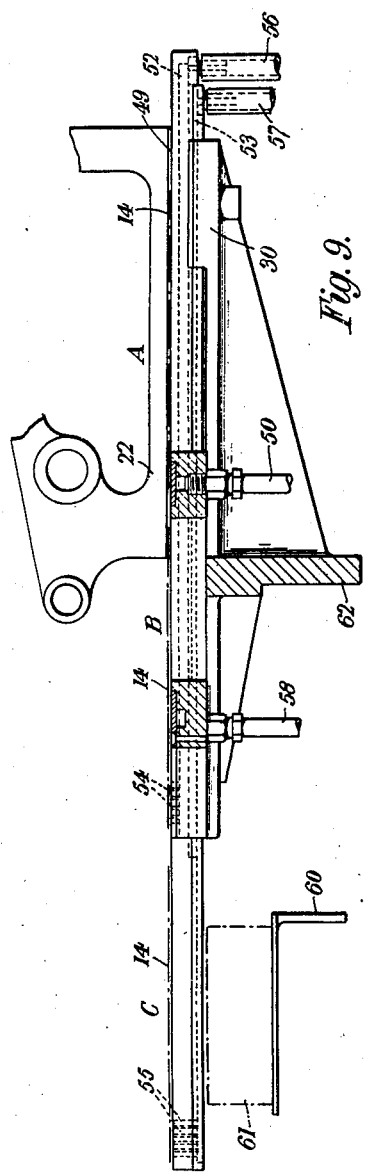
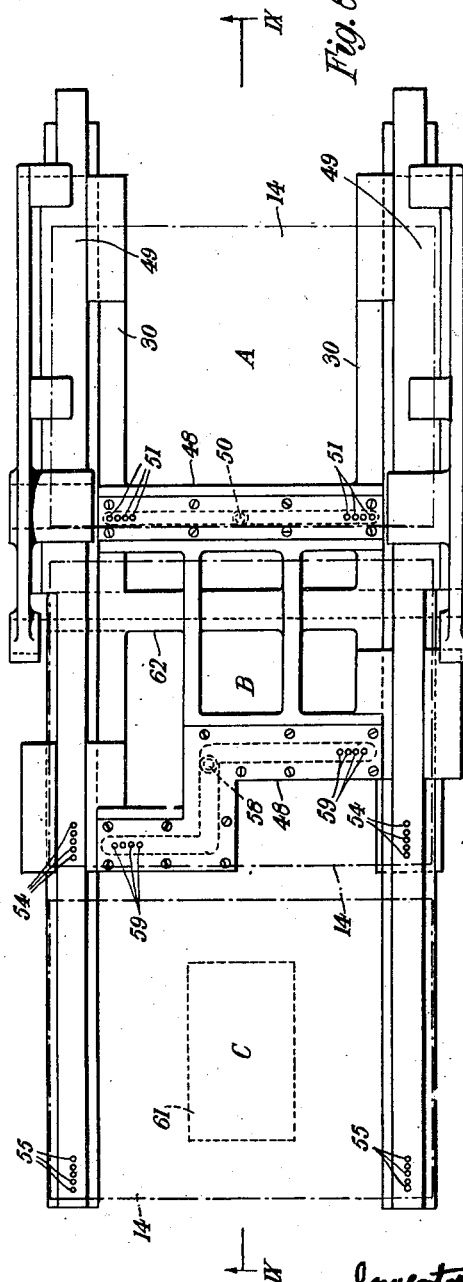

May 1, 1945. A. RUSSELL ET AL 2,374,838
MECHANISM FOR FEEDING WRAPPERS FROM A STACK
Filed Nov. 25, 1943 6 Sheets-Sheet 6
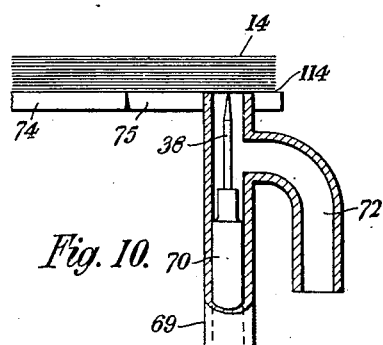
Fig. 10.
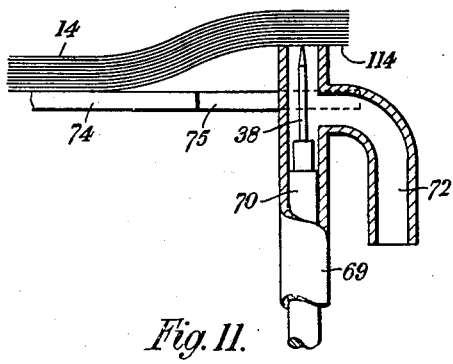
Fig. 11.
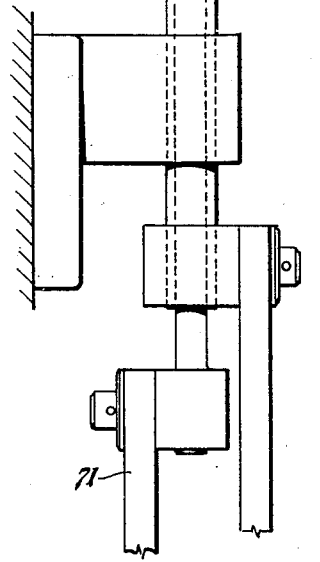
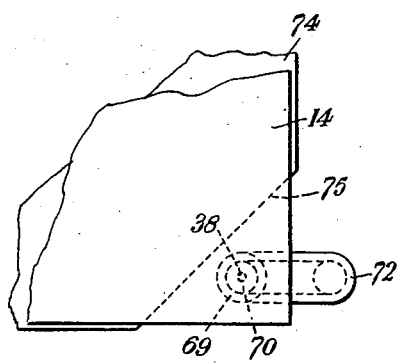
Fig. 12.
Fig. 13.
Inventors
Alexander Russell
Matthew Parker
Richard Amos Harris
By Mock & Nolte attys Patented May 1, 1945

2,374,838

UNITED STATES PATENT OFFICE 2,374,838

MECHANISM FOR FEEDING WRAPPERS FROM A STACK

Alexander Russell, Matthew Parker, and Richard Anson Harris, Leeds, England, assignors to The Forgrove Machinery Company Limited, Leeds, England Application November 25, 1943, Serial No. 511,670
In Great Britain January 25, 1943

4 Claims. (Cl. 271—29)

This invention relates to mechanism for feeding in succession wrappers, sheets, labels or the like (herein referred to as "wrappers") from a stack, and has for its object to provide for partial separation of the end wrapper in the stack from its neighbour with a high degree of precision, so that subsequent complete separation and disposal of the selected end wrapper will be facilitated.

The mechanism according to the invention comprises a feed member for engaging the exposed surface of an end wrapper of the stack near an edge of said wrapper, and adapted to adhere to the wrapper when so engaged (e. g. by suction, adhesive or by melting of wax on the wrapper), and a needle movable relatively to the feed member to pierce the end wrapper held by the feed member and thereby create a gap between the end wrapper and its immediate neighbour.

As there will not be sufficient adhesion between the wrapper pierced by the needle and the one next to its to cause the latter also to be pierced, the point of the needle will establish a gap of accurately predetermined dimensions and extent between the two wrappers. This is of great advantage, and the initial separation of the wrappers so produced can be exploited in any desired way, e. g. by movement of the feed member away from the stack to remove the end wrapper, or by insertion of a gripper jaw, suction plate or the like into the gap to withdraw the end wrapper from the feed member.

We may, in suitable cases, employ a fixed feed member, and a moving needle which operates to pierce the end wrapper and establish the gap by pushing the stack away from the feed member when the latter is adhering to the end wrapper. We prefer however, to employ a moving feed member, which moves with the needle, into engagement with the end wrapper, and to arrange for the needle to dwell, during the initial stage of the movement of the feed member away from the stack, so piercing the end wrapper and preventing the next wrapper from following it.

The mechanism according to the invention can be used for separating the end wrapper from the top or bottom of a stack of wrappers lying in horizontal planes, or indeed for separating either end wrapper of a stack arranged in any position. Where, as is preferred, a movable feed member is arranged to withdraw the bottom wrapper from a stack of superposed wrappers lying each in a horizontal plane, and the stack requires support during feeding of the wrapper, a stack-supporting member is arranged to move into the gap, as the bottom wrapper is withdrawn. The supporting member can operate with certainty because, as already explained, the gap never varies appreciably, either in extent or position.

After having performed its function of enabling safe entry of the stack support between the two lowest wrappers, the needle can at any time, if necessary, be withdrawn below the surface of the pierced wrapper, in order to facilitate removal of the latter by, or from, the feed member, for further disposal in accordance with requirements.

There may, of course, be a plurality of feed members, needles or both, made to operate simultaneously, if, for example the wrappers are of large size. It should be understood that wrappers separated in this manner suffer perforation only, as distinct from the small slit or tear produced in the outer edge of the wrapper by other methods of separation already in general use. Also there is no risk of failure of the separator due to its turning up instead of slitting the wrapper edge as often occurs when using knife-edge type separators.

Two alternative forms of wrapper feed mechanism according to the invention, both designed to withdraw the bottom wrapper from a stack of wrappers lying in horizontal planes, will now be described in further detail, by way of example, with reference to the accompanying drawings, in which.

Figure 4:
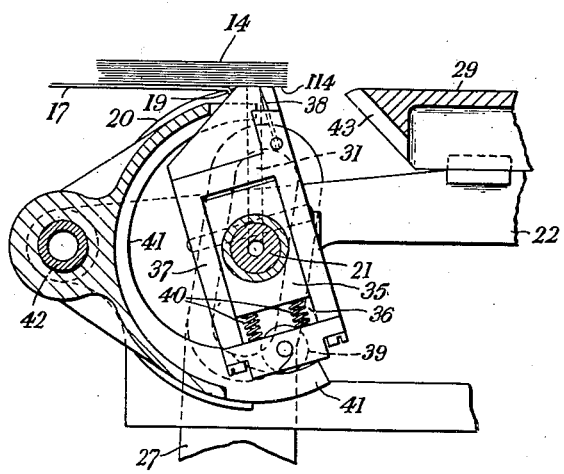
Fig. 4 is a section on the line IV—IV in Fig. 3, showing the peelers and associated needle in their initial positions, this figure showing only the parts essential to the removal of a wrapper from the stack.
Figure 5:
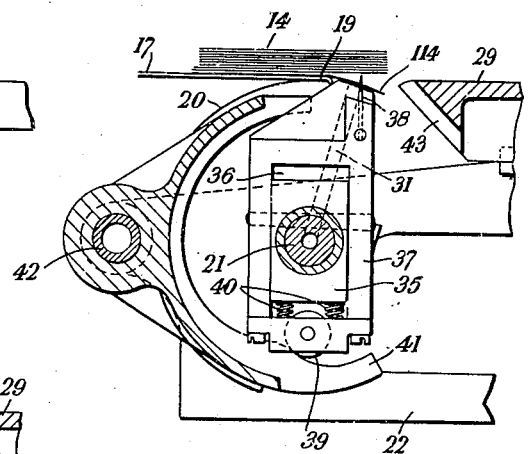
Figure 6:
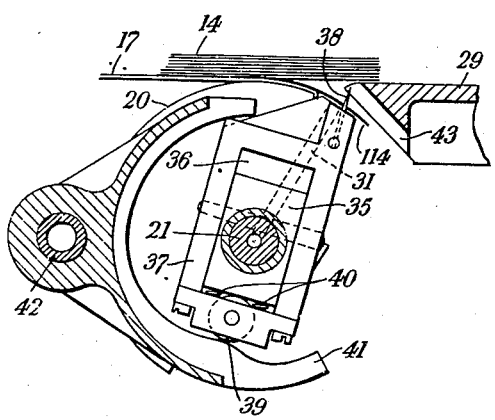
Figure 7:
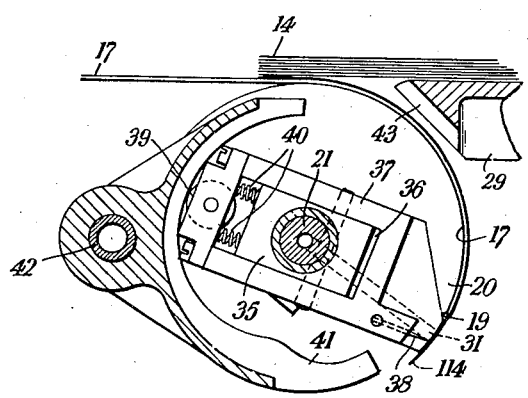

Figs. 5–7 are respectively sectional views corresponding to Fig. 4 and showing successive positions assumed by the peelers and needle during the removal of the wrapper, Fig. 8 is an enlarged plan view of the lower portion of the framework carrying the peelers, the framework being shown in the position which it occupies at the conclusion of the peeling operation, Fig. 9 is a section on the line IX—IX in Fig. 8, Fig. 10 is a side elevation, partly in section showing the second embodiment, Figs. 11 and 12 are respectively similar views showing successive positions assumed by the parts during the removal of a wrapper from the stack, and Fig. 13 is a plan view corresponding to Fig. 10.

Like reference numerals indicate like parts throughout the drawings.

In the arrangement shown in Figs. 1-9, there is a peeler feed of the kind described in British Patent No. 492,787. The wrappers 14 are confined in a stack by a magazine 16, secured to a fixed upright 47 and comprising four angle section corner posts 15. The stack of wrappers is supported on two belts 17 (Figs. 1-3), each fixed at one end 18 to the framework of the machine and at the other end 19 to a peeler 20. The peelers are fixed to a shaft 21 mounted to rotate in side members 22, forming part of a framework which is reciprocated beneath the stack by a cam mechanism.

The cam mechanism is constituted by an eccentric 24 mounted on the cam shaft 23 and encircled by a strap 25 pivoted to a rod 26 (Fig. 2) fixed to a pair of arms 27. These are pivoted at their lower ends on a fixed shaft 28 and carry at their upper ends bearings for the peeler shaft 21.

Figure 1:
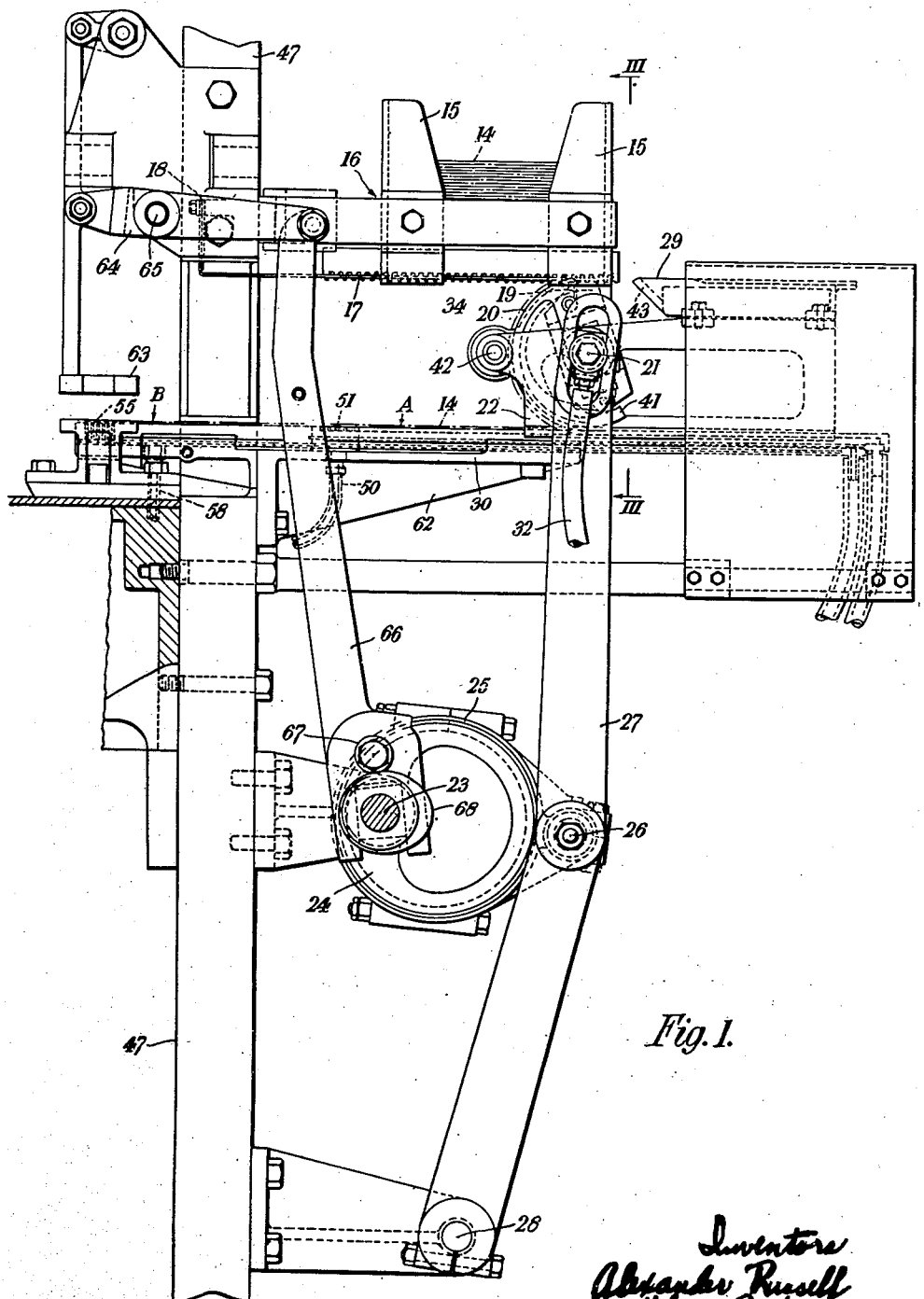
Fig. 1 is a side elevation of the first embodiment.
Figure 2:
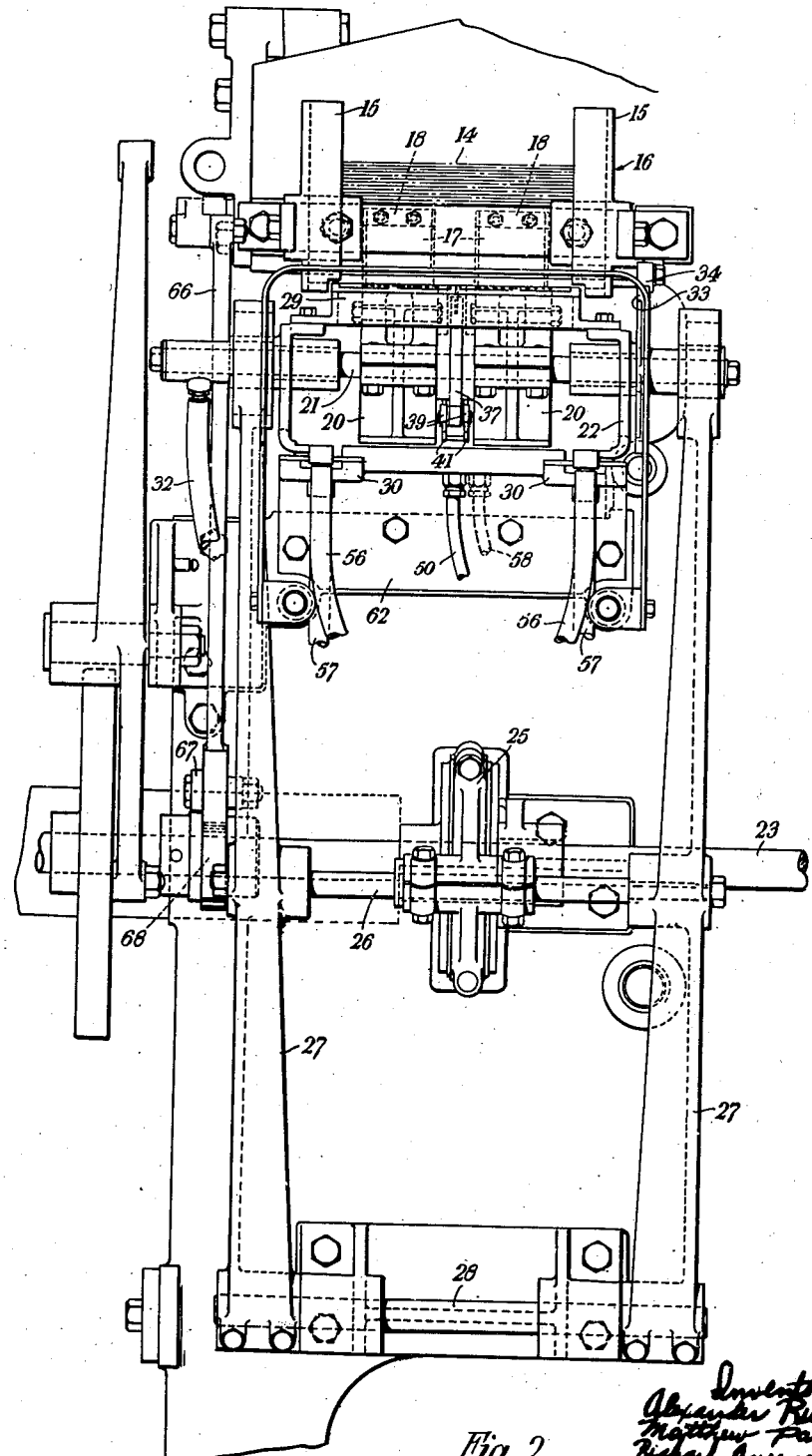
Fig. 2 is an end elevation, looking from the right hand side in Fig. 1.
Figure 3:
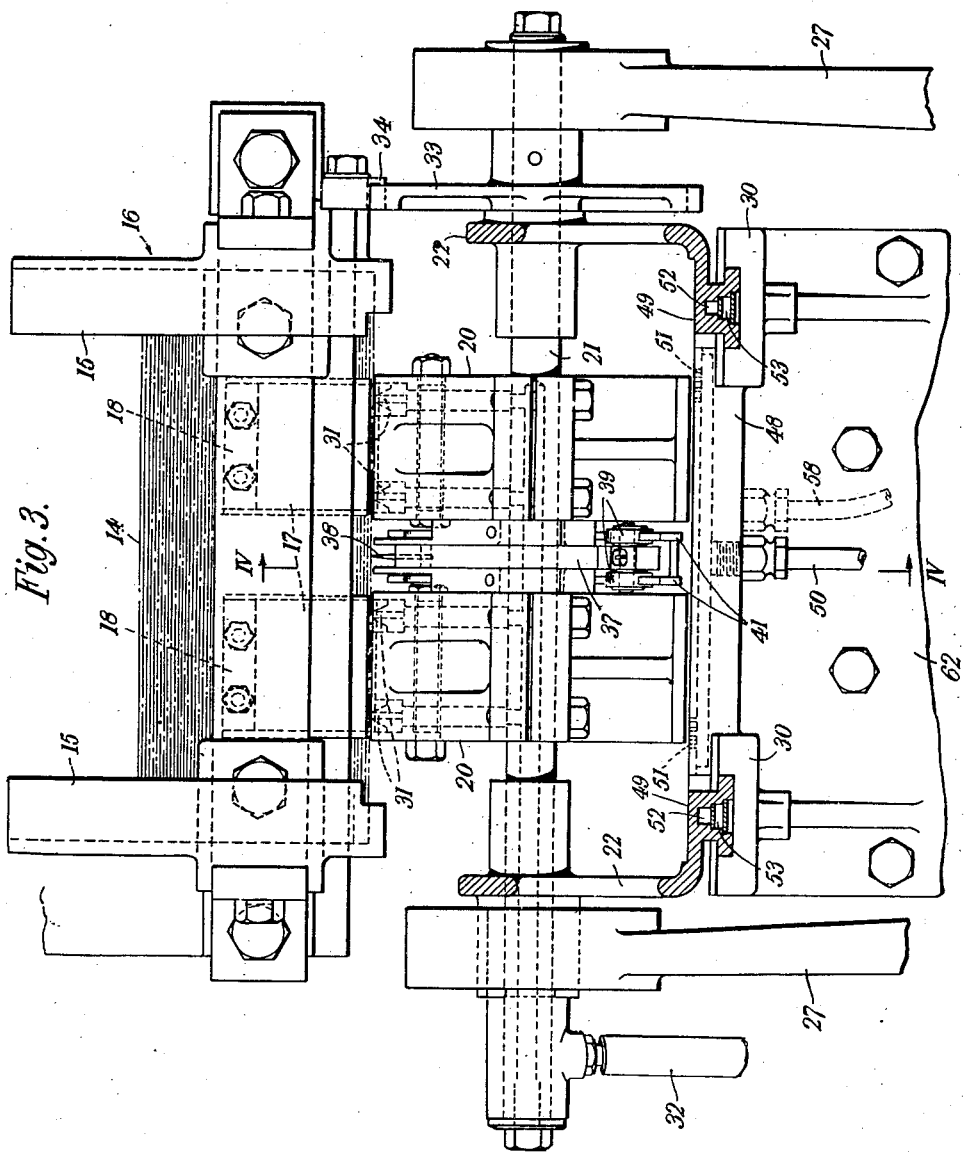
Fig. 3 is an enlarged section on the line III—III in Fig. 1.

The side members 22 carry a stack support 29, the function of which will be described later, and are slidable each in a fixed guide member 30 (Figs. 3 and 8) constituted by a flange on the top of a bracket 62. At the commencement of a cycle of operations the movable framework occupies its right hand position shown in Fig. 1. The peelers 20 are then in contact with the bottom wrapper of the stack near its right hand edge (see Fig. 4). Suction is applied at this stage to suction holes 31 in the peelers via the hollow interior of the peeler shaft and a suction pipe 32 (Fig. 3). The movable framework then begins to move to the left (Fig. 1), carrying the peeler shaft 21 with it. A pinion 33 fast on the peeler shaft engages a fixed rack 34 (Fig. 3) and the peelers are thus caused, during their reciprocation, to rotate clockwise as seen in Figs. 1 and 4-7. They thus peel the bottom wrapper from the stack. The belts 17 are caused to wind on to the rotating peelers, but the stack support 29 moves forward into position to support the right hand end of the stack as the peelers withdraw to the left (see Figs 6 and 7).

On the peeler shaft (see Fig. 4) is fixed a rectangular block 35, engaging in a slot 36 in a slider 37 which carries a needle 38. On the slider are mounted runners 39 (see also Fig. 3) held, by springs 40, in contact with identical internal profiles of a cam 41 fixed to the side members 22 of the movable framework by a pin 42. As the slider 37 is forced to rotate with the peelers 20 by the rectangular block 35, the runners 39 will consequently travel along the cam 41, so providing a relative movement between the slider 37 and the block 35 determined by the contour of the cam.

At the start (Fig. 4) the needle is inclined to the left of the vertical, with its point just below the bottom wrapper. The cam 41 is so shaped that for a short period after the start of the peeler movement the needle point remains very nearly stationary, its lower end rocking clockwise about this stationary point (Fig. 5). The result is that the bottom wrapper 114 is drawn down by the peelers over the point of the needle and pierced, the needle point remaining at stack level and preventing other wrappers from following the first one (see Fig. 5). The stack support 29 is shown in Fig. 6 as beginning to move horizontally into the gap formed between the bottom wrapper and the stack, the support having a groove 43 in its forward end to allow clearance for the needle 38. As soon as the nose of the support has entered safely under the stack, the function of the needle is completed, and the cam allows it to move away with the peelers (Fig. 6), and finally (Fig. 7) retracts it through the puncture in the wrapper, before the peelers arrive into position to transfer the wrapper to a stationary feed member 48 (Fig. 8). This transference is therefore not impeded by the needle.

It will be understood that during the puncturing operation the needle rotates relatively to the stack and other fixed parts of the machine, but that relatively to the peelers and the wrappers being fed it executes a rectilinear motion in the direction of its length.

The stationary feed member 48 bridges the brackets 62, and the wrapper delivered to it by the peelers lies horizontally in position A (Figs. 8 and 9), its rear end being supported on carrier surfaces 49 of the members 22. Suction is then applied, from a suction pipe 50, to suction holes 51 in the stationary feed member, so causing the forward end of the wrapper in position A to adhere to the stationary feed member.

The side members 22 of the movable framework are formed each with two suction channels 52, 53 (Fig. 3) communicating respectively with suction holes 54, 55 (Fig. 8) and with suction pipes 56, 57.

At the start of a peeling cycle suction is cut off from the suction holes 51 in the stationary feed member, and is applied to the rear suction holes 54 in the movable framework. As the framework moves to the left therefore a wrapper is transferred from position A to position B, when suction is applied from a pipe 58 to forward suction holes 59 in the stationary feed member, which hold the forward end of the wrapper in position B. Suction is cut off from holes 54 before the movable framework returns to the right.

On its left hand movement the movable framework also transfers a wrapper from position B to position C, by suction through the holes 55, suction through holes 59 then being cut off. When the framework is stationary in its left hand position, a lifting plunger 60, carrying an article 61 to be wrapped, lifts the C position wrapper off the movable framework (suction through holes 55 then being interrupted) and into the jaws of a wrapping wheel. The distribution of suction to the various suction holes is preferably controlled by a mechanism of the kind described in British Patent No. 544,993.

While the wrapper is in position B a member 63 carrying coding dies is caused to descend upon the wrapper and perforate a design in the corner of the wrapper for identification purposes. The member 63 is reciprocated by a lever 64 mounted on a fixed pivot 65, and connected to a link 66 carrying a roller 67 engaging a cam 68 on the cam shaft 23.

In the second arrangement shown in Figs. 10-13, suction is again employed to obtain adhesion between the bottom wrapper of the stack and the feed member. In this case the feed member takes the form of a tube 69, situated immediately below one corner of the bottom wrapper and capable of reciprocation in such a way that the corner of the stack can be raised and lowered by its agency. Within the tube is a rod 70, carrying a needle 38 at its upper end and being a sliding, but airtight, fit in the tube.

This rod 70 is enabled to reciprocate independently of the tube 69 by means of linkage 71 to a cam mechanism, the linkage 71 being attached to the lower end of the rod, which projects below the bottom of the tube. Attached near the top of the tube is a suction pipe 72 through which air in the upper end of the tube can be exhausted.

The following is the sequence of operations. First (starting from the position of Fig. 10), the needle 38 and tube 69 ascend together—as one unit—the needle point being level with the top of the tube. This movement causes one corner of the stack to be raised a little (Fig. 11). The next operation—exhaustion of air in the tube—causes adhesion of the lowest wrapper to the tube, so that during the descent of the latter, which now takes place, the wrapper accompanies it.

The needle remains in its top position during the descent of the tube (Fig. 12). The wrapper corner adhering to the tube is therefore pierced and drawn down over the needle, until it is level with the bottom of the stack—this being the lower limit of the tube movement. At this stage we have the lowest wrapper lying flat, and the rest of the stack propped up at one corner by the needle, which is protruding through the perforation it has made in the bottom wrapper.

As in the case of the peeler feed the gap between the two lowermost wrappers cannot vary much in extent or position. Into this gap is now introduced a stack support 29 for the purpose of supporting the stack, and permitting removal, by a pair of gripper jaws 73, or equivalent feed member, of the bottom wrapper. When safe entry of this support under the stack has been accomplished, the needle is withdrawn down to the tube level again, and the gripper jaws withdraw the bottom wrapper. Finally the support 29 is retracted to allow the wrapper to return to the position shown in Fig. 10.

As shown in Fig. 13 a plate 74 which supports the stack is cut away at one corner 75, to permit of the upward movement of the tube and needle.

What we claim as our invention and desire to secure by Letters Patent is:

1. In a mechanism for feeding wrappers, labels, sheets and the like in succession from a stack, the combination of a suction peeler, adapted to engage and adhere by suction to the exposed surface of an end wrapper of the stack near the edge of said wrapper, a shaft carrying said peeler, means for communicating combined reciprocating and rotary motion to the peeler and its shaft in relation to the stack to cause the peeler to peel the end wrapper from the stack, a needle mounted on the peeler shaft so as to rotate therewith but free to move radially in relation to the peeler shaft, and a cam for controlling said radial movement of the needle, said needle being positioned adjacent the end wrapper on engagement of said end wrapper by the peeler and being arranged to dwell in said position during the initial stage of the peeling operation, thereby piercing the end wrapper and preventing the next wrapper from following it.

2. In a mechanism for feeding horizontally disposed wrappers, labels, sheets and the like from a stack, a combination of parts as claimed in claim 1, wherein the peeler is arranged to peel the bottom wrapper from the stack, and comprising belts, for supporting said stack, one end of each belt being fixed and the other attached to the peeler, and said belt being arranged to wind on the peeler during the peeling operation, a slidign framework which carries the cam and bearings for the peeler shaft and communicates the reciprocating movement to the peeler, a stack support mounted on said framework and arranged to be moved thereby into position beneath the stack during the peeling operation, a fixed rack and a pinion on the peeler shaft engaging said rack to rotate the peeler shaft on reciprocation of the sliding framework.

3. In a mechanism for feeding horizontally disposed wrappers, labels, sheets and the like from a stack, a combination of parts as claimed in claim 1, wherein the peeler is arranged to peel the bottom wrapper from the stack, and comprising a stationary horizontal suction plate for receiving the peeled wrapper from the peeler, the cam being arranged to withdraw the needle from the perforation in the peeled wrapper before delivery of the peeled wrapper to said suction plate.

4. In a mechanism for feeding horizontally disposed wrappers, labels, sheets and the like from a stack, a combination of parts as claimed in claim 1, wherein the peeler is arranged to peel the bottom wrapper from the stack, and comprising a stationary horizontal suction plate for receiving the peeled wrapper from the peeler, the cam being arranged to withdraw the needle from the perforation in the peeled wrapper before delivery of the peeled wrapper to said suction plate, said first named means including a sliding framework which carries the cam and bearings for the peeler shaft, and communicates the reciprocating movement to the peeler, said framework constituting a suction feed member for feeding, at each peeling cycle, the wrapper on the suction plate to a further station.

ALEXANDER RUSSELL.
MATTHEW PARKER.
RICHARD ANSON HARRIS.